United States Patent [19]
Morrison

[11] Patent Number: 5,559,724
[45] Date of Patent: Sep. 24, 1996

[54] METHODS AND SYSTEMS FOR DESIGNING BEAM ARRAY GENERATORS

[75] Inventor: Rick L. Morrison, Naperville, Ill.

[73] Assignee: Lucent Technologies Inc., Murray Hill, N.J.

[21] Appl. No.: 312,858

[22] Filed: Sep. 27, 1994

[51] Int. Cl.$^6$ .................................................. G06F 17/00
[52] U.S. Cl. ............................................ 364/525; 359/569
[58] Field of Search .............................. 364/525, 514 R; 359/10, 11, 127, 569, 570, 571, 566, 575; 430/5, 320, 321

[56] References Cited

U.S. PATENT DOCUMENTS

| | | | |
|---|---|---|---|
| 3,884,546 | 5/1975 | Chu | 359/571 |
| 4,764,680 | 8/1988 | Geary | 359/571 |
| 4,779,235 | 10/1988 | Kubota | 359/569 |
| 4,961,615 | 10/1990 | Owechko et al. | 359/569 |
| 5,113,286 | 5/1992 | Morrrison | 359/569 |
| 5,326,659 | 7/1994 | Liu et al. | 430/5 |
| 5,432,714 | 7/1995 | Chung et al. | 364/525 |
| 5,465,220 | 11/1995 | Haruki et al. | 364/525 |

OTHER PUBLICATIONS

Taghizadeh et al.; "Damman Grating Arary Generators in Amorphous Silicon Nitride"; Holographic Systems, Components and Applications ( IEEE Conf. Pub. 311); 1989.
Robertson et al; "Construction of Space–Invaraiant Fan–Out Holograms by Copying Damman Grating Onto Dichromated Gelatin"; IEEE Colloq. (1988) No. 121: Optical Interconnects 1988.
Feldman, M. R., and Guest, C. C., "Interactive Encoding of High–Efficiency Holograms for Generation of Spot Arrays," Optical Letters, vol. 14, No. 10, May 15, 1989, pp. 479–481.
Gerchberg, R. W., and Saxton, R. W., "A Practical Algorithm for the Determination of Phase from Image and Diffraction Plane Pictures," OPTIK, vol. 35, No. 2, 1972, pp. 237–246.
Goodman, J. W., *Introduction to Fourier Optics*, McGraw-Hill, Inc., Chaps. 3 and 4, 1968, pp. 30–76.
Morrison, R. L., "Symmetries That Simplify the Design of Spot Array Phase Gratings," Journal of the Optical Society of America, vol. 9, No. 3, Mar. 1992, pp. 464–471.
Morrison, R. L., "Beam Array Generation and Holographic Interconnections in a Free–space Optical Switching Network," Applied Optics, vol. 32, No. 14, May 10, 1993, pp. 2512–2518.

*Primary Examiner*—Ellis B. Ramirez

[57] ABSTRACT

Disclosed are methods and systems for designing beam array generators, or phase masks, utilizing an optimization process which generates an output data set representative of a desired phase grating. Initially an input data set representative of a desired image intensity is received. The output data set comprising a plurality of subsets is defined and initialized. The output data set is traversed by selectively examining ones of the plurality of subsets to determine if a current examined subset represents a phase boundary. Upon such a determination, the output data set is processed as a function of the input data set to improve the quality of the phase grating.

31 Claims, 7 Drawing Sheets

Microfiche Appendix Included
(1 Microfiche, 42 Pages)

METHODS AND SYSTEMS FOR DESIGNING BEAM ARRAY GENERATORS

This specification is accompanied by a microfiche appendix of one sheet and 42 frames.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATION

The present invention is related to U.S. patent application Ser. No. 08/312,859 filed on Sep. 27, 1994 entitled "Methods and Apparatus for Generating and Displaying Holographic Images Utilizing a Laser Pointer," commonly assigned to the assignee of the present invention, and filed concurrently herewith. The disclosure of this related Application is incorporated herein by reference.

TECHNICAL FIELD OF THE INVENTION

The present invention relates in general to holography and to laser technology, and more particularly to methods and systems for designing beam array generators.

BACKGROUND

Conventional free-space digital optical systems require optical power supplies which generate two dimensional arrays of uniform intensity radiation beams ("beam arrays"). This is more fully described in "Beam Array Generation and Holographic Interconnections in a Free-Space Optical Switching Network," *Applied Optics*, vol. 32, no. 14, pp. 2512–2518, 1993, by R. L. Morrison, S. L. Walker and T. J. Cloonan, which is incorporated herein by reference. Beam arrays are utilized to illuminate opto-electronic logic devices to perform a host of communication functions, including the transferring of data and the optical encodation of information, for example.

Beam arrays are typically generated by illuminating a processing system designed Fourier-plane phase grating, or hologram, with a laser beam source. A laser beam more particularly is a narrow beam of coherent and nearly monochromatic electromagnetic radiation. Phase gratings are desired in digital optical systems because of their high diffraction efficiency. High diffraction efficiency more particularly is the phase grating's ability to couple a large fraction of impinging light energy into the beams of the beam array. It is desirable to accomplish this with little or no absorption of light intensity by the phase grating. Phase, or surface relief, gratings, also referred to as multiple beam splitters, are generally designed using a programmable processing system that operates to generate a data set representative of the desired phase grating. The generated data set is utilized by a conventional fabrication process to produce the physical phase grating.

One processing system implementation uses an interactive discrete on-axis encoding algorithm, which is more fully described in "Interactive Encoding of High-efficiency Holograms for Generation of Spot Arrays," *Optics Letters*, vol. 14, no. 10, pp. 479–481, May 1989, by M. R. Feldman and C. C. Guest, and which is incorporated herein by reference. In accordance with this algorithm, one period of the Fourier-plane hologram is divided into an array of rectangular cells wherein each cell imparts one of two fixed phase delays to the incident wave-front. This algorithm, similar to other conventional implementations, is typically inefficient, both in the resources required by, and quality of, the design process. In particular, the required processing resources include large quantities of memory, high input/output throughput and vast amounts of processing time to design satisfactory holograms. Relatively lengthy satisfactory hologram design is particularly commercially unacceptable.

SUMMARY OF THE INVENTION

The problems of the prior art are overcome in accordance with the principles of the present invention which utilizes scaler diffraction theory in conjunction with a sophisticated process to generate a data set representative of a desired phase grating. Scaler diffraction theory defines the relationship between the phase grating and the image generated when the laser beam intersects and illuminates the phase grating, and is more fully described in *Introduction to Fourier Optics*, chaps. 3 and 4, pp. 30–76, 1968, by J. W. Goodman, which is incorporated herein by reference.

One system in accordance with the principles of the present invention for generating an output data set representative of a desired phase grating includes input receiving, generating, traversing and processing means. The input receiving means operate to receive an input data set representing a desired image intensity. The generating means generate an output data set comprising a plurality of phase cells and representing a desired phase grating, wherein each phase cell includes a phase value. The traversing means traverse ones of the plurality of phase cells wherein each of the traversed phase cells' phase value is in one of a first state equal to an adjacent phase cell's phase value and a second state not equal to the adjacent phase cell's phase value. The processing means, operable when a current traversed phase cell's phase value is in the second state, processes the output data set as a function of the input data set to improve the quality of the desired phase grating.

One processing system in accordance with the principles of the present invention for generating an output data set includes input means for receiving an input data set and at least one processing unit. The received input data set represents a desired image and the output data set represents a phase grating operable to generate a desired image when illuminated by a coherent radiation source. The processing unit operates to generate and initialize the output data set comprising a plurality of subsets, and to selectively examine the output data set by probing ones of the subsets to locate a phase boundary. Upon location of the phase boundary, the processing unit operates to process the output data set as a function of the input data set to improve the quality of the desired phase grating.

One method of operation in accordance with the principles of the present invention concerns generating an output data set representative of a phase grating. The method comprises the steps of receiving, defining and initializing, traversing, and processing. The receiving step involves an input data set representative of a desired image intensity. The defining and initializing step involves the output data set comprising a plurality of subsets. The traversing step involves selectively examining ones of the plurality of subsets to determine if a current examined subset represents a phase boundary. The processing step involves, upon a determination that the current examined subset represents the phase boundary, processing the output data set as a function of the input data set to improve the quality of the phase grating.

Another method of operation in accordance with the principles of the present invention concerns the generation of a phase data set representative of a desired phase grating, and begins when an image data set is received. The image data set is comprised of a plurality of pixels and represents a desired beam array image. The phase data set, which is comprised of a plurality of phase cells, is defined and initialized as a function of the image data set wherein the plurality of phase cells collectively correspond via scaler diffraction to the plurality of pixels. The plurality of phase cells are examined and, upon a determination that a current examined phase cell is different from an adjacent phase cell, the phase data set is selectively processed as a function of the image data set to improve the quality of the desired beam array image. The selective processing is accomplished by copying the current examined phase cell to a variable stored to memory storage device, setting the current examined phase cell equal to the adjacent phase cell, and calculating a merit value representative of the quality of the desired phase grating for coupling radiation into a set of designated orders. The merit value indicates one of an improvement, a regression, and a stagnation of the desired beam array image. The calculation step further includes returning to the examining step when the merit value indicates improvement or regression. If the merit value indicates regression, the current examined phase cell is reset from the variable stored in the memory storage device. When the merit value indicates stagnation, the phase data set is stored to the same or another memory storage device, unless a target threshold has not been attained, in which case, the method returns to the examination step.

One embodiment for using and/or distributing the present invention is as software stored to a storage medium. The software includes a plurality of processing system instructions for controlling at least one processing unit for generating a data set representative of a desired phase grating in accordance with the principles of the present invention. The storage mediums utilized may include, but are not limited to, magnetic, optical, and semiconductor chip. Alternate embodiments of the present invention may also be implemented in hardware or firmware.

BRIEF DESCRIPTION OF THE DRAWINGS

For a more complete understanding of the present invention, and the advantages thereof, reference is made to the following descriptions taken in conjunction with the accompanying drawings in which like numbers designate like parts, and in which:

FIG. 8b illustrates an artist's rendition of the holographic image generated utilizing the hand held laser pointer in FIG. 7 to illuminate the phase grating in FIG. 8a;

DETAILED DESCRIPTION OF THE INVENTION

The principles of the present invention, and the features and advantages thereof, are better understood by referring to the illustrated embodiment depicted in FIG. 1–9 of the drawings and the processing system software set forth in the microfiche appendix.

Figure 1:
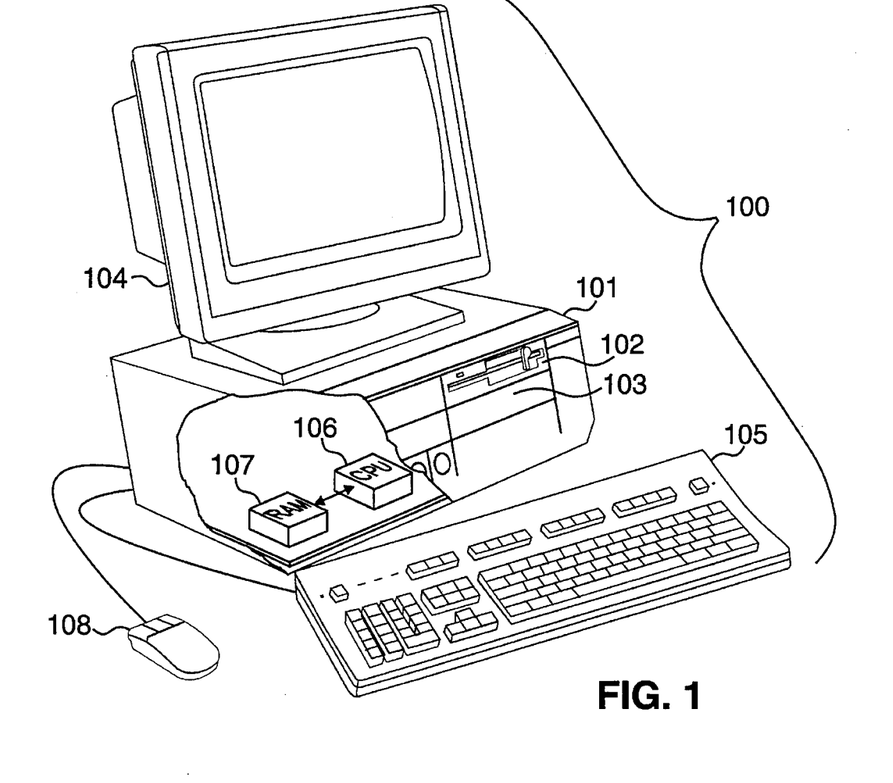
FIG. 1 illustrates an isometric view of a personal computer in accordance with the principles of the present invention.

FIG. 1 illustrates an isometric view of a personal computer ("PC") 100 which may be programmed to generate a data set representative of a desired phase grating. PC 100 is comprised of a hardware casing 101 (illustrated having a cut-away view), a monitor 104, a keyboard 105 and a mouse 108. Note that the monitor 104, and the keyboard 105 and mouse 108 may be replaced by, or combined with, other suitably arranged output and input devices, respectively. Hardware casing 101 includes both a floppy disk drive 102 and a hard disk drive 103. Floppy disk drive 102 is operable to receive, read and write to external disks, while hard disk drive 103 is operable to provide fast access data storage and retrieval. Although only floppy disk drive 102 is illustrated, PC 100 may be equipped with any suitably arranged structure for receiving and transmitting data, including, for example, tape and compact disc drives, and serial and parallel data ports. Within the cut away portion of hardware casing 101 is a processing unit 106, coupled with a memory storage device, which in the illustrated embodiment is a random access memory ("RAM") 107. Although PC 100 is shown having a single processing unit 106, PC 100 may be equipped with a plurality processing units 106 operable to cooperatively carry out the principles of the present invention. Similarly, although PC 100 is shown having the single hard disk drive 103 and memory storage device 107, PC 100 may be equipped with any suitably arranged memory storage device, or plurality thereof. Further, although PC 100 is utilized to illustrate a single embodiment of a processing system, the principles of the present invention may be implemented within any processing system having at least one processing unit, including, for example, sophisticated calculators and hand held, mini, main frame and super computers, including RISC and parallel processing architectures, as well as within processing system network combinations of the foregoing. In the preferred embodiment, PC 100 is a Sun Sparcstation 10, which is available from Sun Microsystems, Inc., located in Mountain View, Calif., USA. The processing environment of the Sparcstation 10 is preferably provided by a UNIX operating system.

Figure 2:
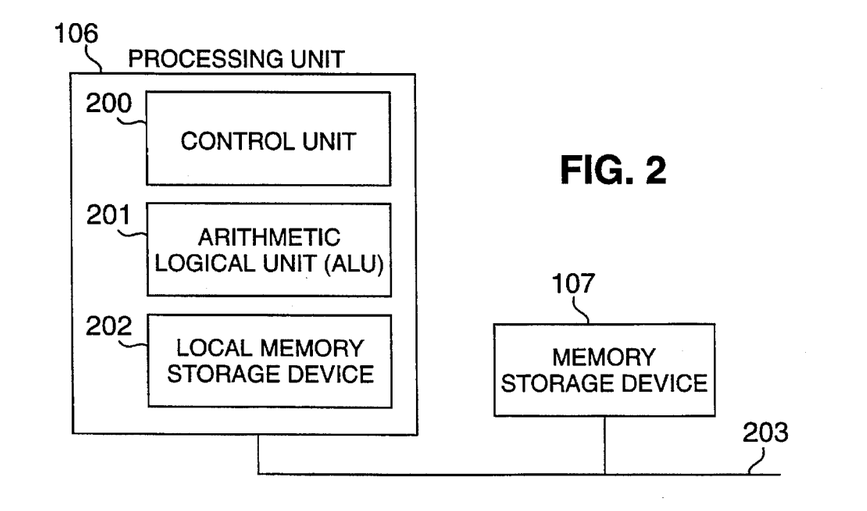
FIG. 2 illustrates a block diagram of a microprocessing system, including a single processing unit and a single memory storage device, which may be utilized in conjunction with the personal computer in FIG. 1.

FIG. 2 illustrates a block diagram of one microprocessing system, including a processing unit and a memory storage device, which may be utilized in conjunction with PC 100. The microprocessing system includes a single processing unit 106 coupled via data bus 203 with a memory storage device, such as RAM 107, for example. Memory storage device 107 is operable to store one or more instructions which processing unit 106 is operable to retrieve, interpret and execute. Processing unit 106 includes a control unit 200, an arithmetic logic unit ("ALU") 201, and a local memory storage device 202, such as, for example, stackable cache or a plurality of registers. Control unit 200 is operable to fetch instructions from memory storage device 107. ALU 201 is operable to perform a plurality of operations, including addition and Boolean AND needed to carry out instructions. Local memory storage device 202 is operable to provide local high speed storage used for storing temporary results and control information.

Figure 3:
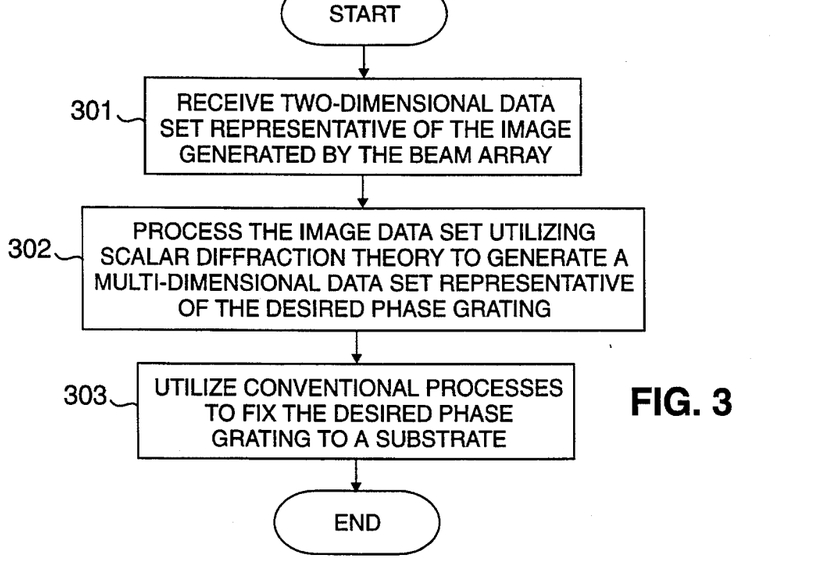
FIG. 3 illustrates a flow diagram of a process for designing phase gratings in accordance with the principles of the present invention.

FIG. 3 illustrates a flow diagram of a process for designing phase gratings for generating beam arrays in accordance with the principles of the present invention. Beam arrays, as previously introduced, illuminate opto-electronic logic device arrays, for example, to transfer data and to optically encode information. Beam arrays are preferably produced by illuminating a processing system designed Fourier-plane phase grating utilizing a narrow coherent radiation beam, where the radiation beam illuminates a plurality of phase grating periods, and preferably more than three periods along each dimension. Alternatively, the phase gratings designed in accordance with the principles of the present invention may be utilized in conjunction with other holography related technologies, such as, for example, hand held laser pointer technologies for generating phase images, as is more fully discussed with reference to FIGS. 6–8. When the process begins, START block 300, a two-dimensional data set representation of the image generated by the beam array is preferably received by a processing system, such as PC 100, block 301. The data set is preferably an estimate of the desired intensity image, and is derived from either a memory storage device or is input contemporaneously. Techniques for estimating the desired intensity image are known, such as, for example, utilizing an image scanning device coupled with a processing system, such as PC 100; a computer aided design program or CAD system; or processing system based drawing and rendering program. The processing system processes the two dimensional data set utilizing scaler diffraction theory to generate a multi-dimensional data set representative of the corresponding phase grating, block 302. Scaler diffraction theory is more fully described in *Introduction to Fourier Optics,* chaps. 3 and 4, pp. 30–76, 1968, by J. W. Goodman, which is incorporated herein by reference. The preferred process for accomplishing the foregoing is more fully discussed with reference to FIGS. 4 and 5. The multi-dimensional data set is utilized by known conventional processes to fix the desired phase grating to a substrate, block 303. Fixed, as used herein, shall mean one or more of the following, but is not limited to, attached, imprinted, adhered, etched, mounted, inserted, deposited, scratched, or otherwise imaged or positioned. Conventional processes, for example, may include, but are not limited to, performing contact microlithography to generate an amplitude mask, transferring the pattern resident to the amplitude mask to a photosensitive resist, and preforming reactive ion etching to fix the phase grating to the substrate. The quality of the phase grating produced is preferably quantified by its diffraction efficiency for coupling light into a set of designated orders, as well as the relative deviation of the beam intensities from their targeted value as defined by the received two-dimensional image data set.

Figure 4A:
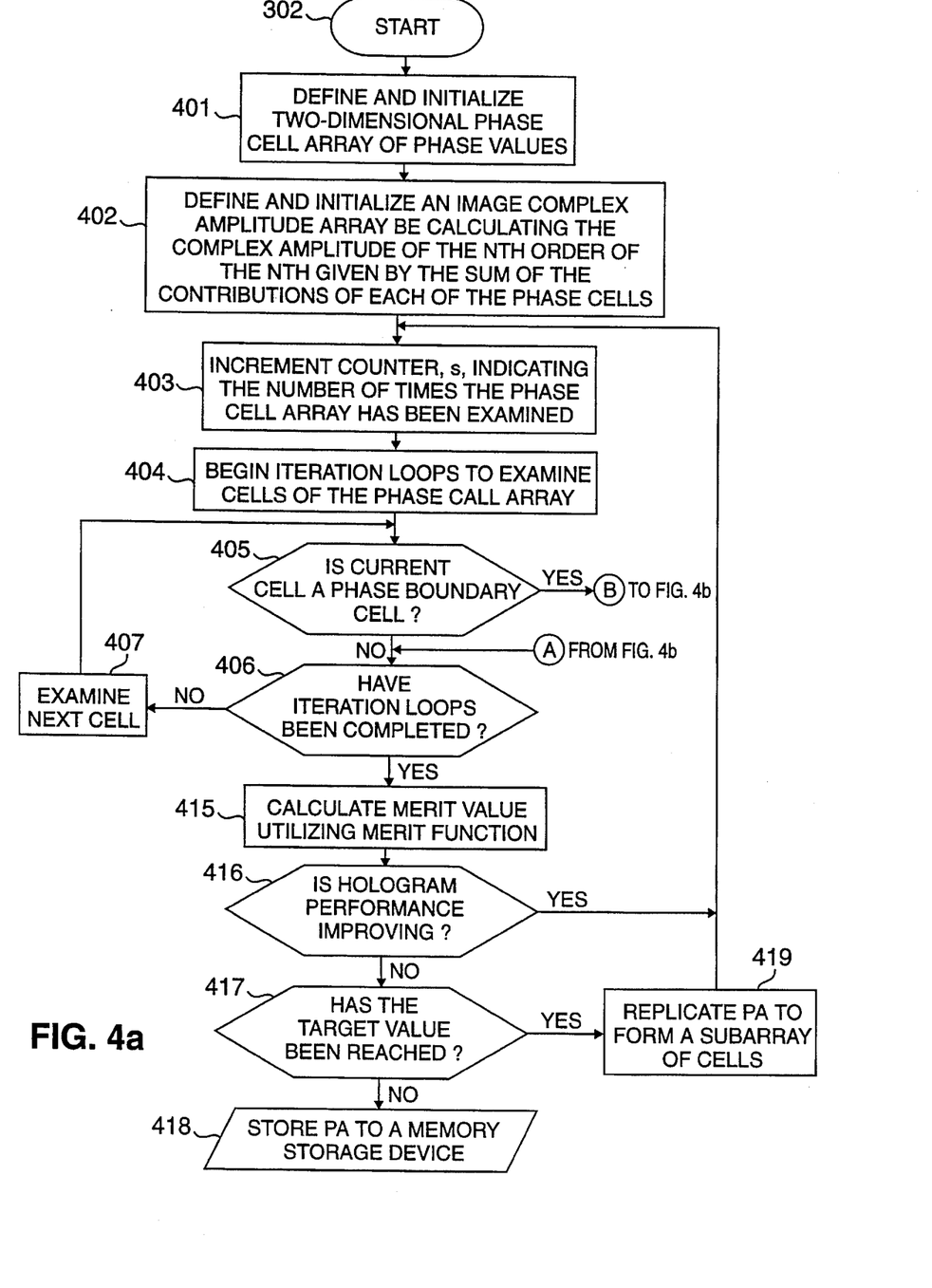
FIGS. 4a and 4b illustrate a detailed flow diagram of a process for designing the beam array generators in FIG. 3 in accordance with the principles of the present invention.
Figure 4B:
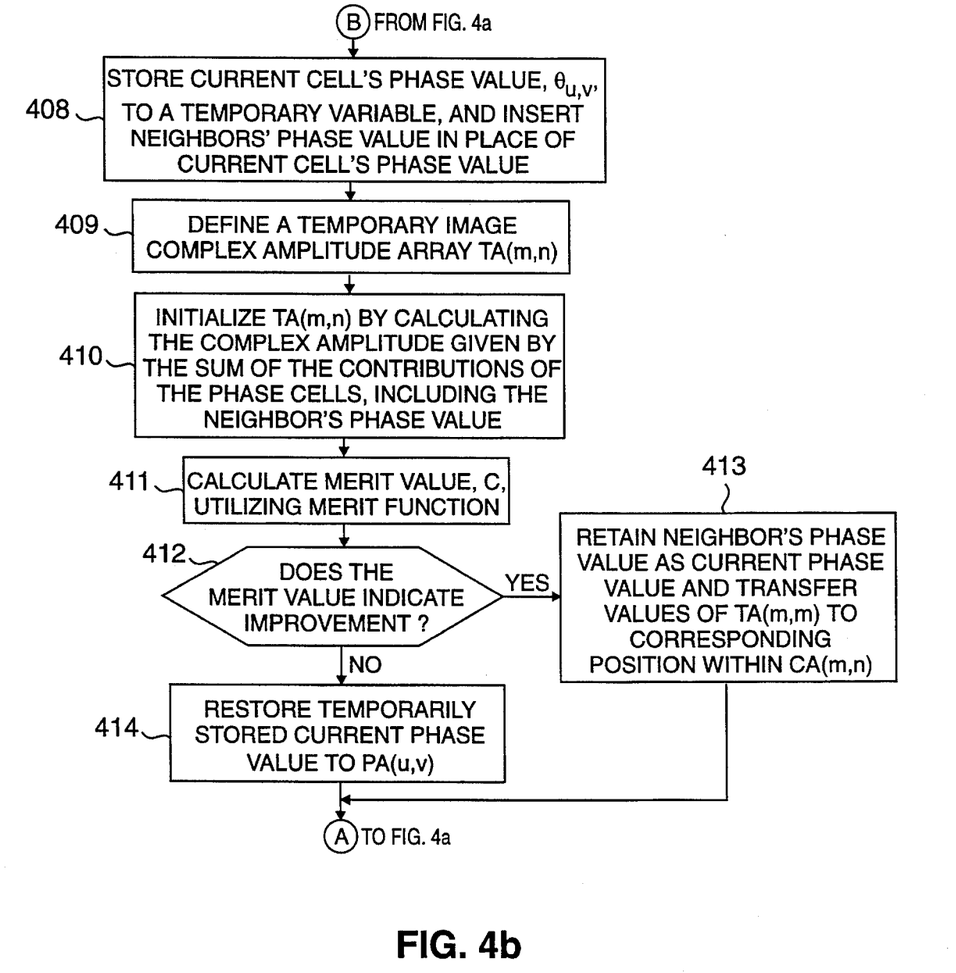

FIGS. 4a and 4b collectively illustrate a flow diagram for generating a data set representative of a desired phase grating in accordance with the principles of the present invention. Preferably, the process herein illustrated is programmed in the C programming language, although any functionally suitable programming language may be substituted for or utilized in conjunction therewith. Attached herewith is a microfiche appendix illustrating one implementation of the preferred embodiment of the invention. The process is preferably compiled into object code and loaded onto a processing system, such as PC 100, for utilization. Alternatively, the principles of the present invention may be embodied within any suitable arrangement of firmware or hardware, as previously introduced. A two dimensional target array ("TA (x,y)") containing x by y picture elements ("pixels") is preferably defined and initialized, as shown in block 301 of FIG. 3, prior to entering the START block 302. Recall, that when a coherent radiation beam strikes a phase grating, a beam array is generated. The beam array produces an image whose intensity is defined by the characteristics of the phase grating. TA is a collective estimation of the image intensity generated when the desired phase grating is intersected and illuminated by the colliniated source. In alternate embodiments, however, the target array may be defined and initialized as needed to maximize the amount of memory storage space available.

The process begins upon entering the START block 302, where a two dimensional phase cell array ("PA (J,K)") is defined containing J by K phase cells, or holographic elements, block 401. The phase cells are preferably a collective data representation of one period of the desired phase grating. The relationship between the phase cell array and the target array is functionally defined by scaler diffraction theory, in other words, any alteration to a single cell of PA or to a single pixel of TA causes a corresponding change in the entire target or phase cell array, respectively. Preferably, PA is initialized utilizing an application of the Gerchberg-Saxton algorithm for fast Fourier transforms, which is more fully described in "A Practical Algorithm for the Determination of Phase from Image and Diffraction Plane Pictures, "*Optik* vol. 35 no. 2, pp. 237–246, 1972, by R. W. Gerchberg and W. O. Saxton, which is incorporated herein by reference. The Gerchberg-Saxton algorithm operates utilizing scaler diffraction theory to rapidly generate a rudimentary solution for each of the phase cells of PA. The foregoing is accomplished as a function of the image data stored in TA and the hologram data stored in PA. In one alternate embodiment, PA is initialized utilizing a random distribution of values within the set [0, . . . , L–1], where L is the number of phase levels in the phase grating design. In either case, or as a result of the use of other functionally suitable initialization algorithms, the rudimentary intensity derivations are utilized in accordance with the principles of the present invention to generate a relatively high quality data set representation of the desired phase grating.

An image complex amplitude array ("CA(m,n)") is preferably defined, by calculating the complex amplitude of the nth order of the mth row as given by the sum of the contributions from each of the phase cells of PA, $$CA(m,n) = B_{m,J} \cdot B_{m,K} \cdot \sum_{j=0}^{J-1} \sum_{k=0}^{K-1} F_{m,j,J} \cdot F_{n,k,K} \cdot \exp(i\theta_{j,k}).$$

The foregoing is preferably accomplished by first calculating the Fourier coefficients, B and F, $$B_{m,J} = \frac{1}{2\pi m} \cdot \sin\left(2\pi \frac{m}{J}\right) \cdot \exp\left(-i\pi \frac{m}{J}\right),$$

$$B_{n,K} = \frac{1}{2\pi n} \cdot \sin\left(2\pi \frac{n}{k}\right) \cdot \exp\left(-i\pi \frac{n}{k}\right),$$

$$F_{m,j,J} = \exp\left(-2\pi i \frac{mj}{J}\right),$$

and $$F_{n,k,K} = \exp\left(-2\pi i \frac{mk}{K}\right),$$

block 402. B and F may be stored in one or more multidimensional arrays, or calculated as needed. Preferably, however, the Fourier coefficients are calculated and stored in two one-dimensional coefficient arrays. Note an aspect of the invention is that by calculating and storing these trigonometric and complex exponential values before the iterative process begins, processing resource requirements are significantly reduced. This calculation is preferably accomplished utilizing the symmetries associated with the value of each of the Fourier coefficients, which, should be noted, repeat every $2\pi$, to provide a more efficient use of available memory storage space. Symmetries that simplify the preferred design process are more fully described in "Symmetries that Simplify the Design of Spot Array Phase Gratings," *Journal of Optical Society of America*, vol. 9, no. 3, pp. 464–471, March 1992, by R. L. Morrison, which is incorporated herein by reference. Symmetries are also preferably introduced and utilized to modify the complex amplitude function, $$CA(m,n) = B_{m,J} \cdot B_{m,K} \cdot \sum_{j=0}^{J-1} \sum_{k=0}^{K-1} F_{m,j,J} \cdot F_{n,k,K} \cdot \exp(i\theta_{j,k}),$$

and to reduce the number of phase cells in PA, preferably along each dimension. Hence, before or after the phase grating period is to be fixed to the optical substrate, the data representation defined by PA is suitably replicated and modified according to the nature of the symmetry used. For example, for an even numbered binary phase design represented by PA, the initial pattern is replicated in each quadrant of a period, additionally, any two diagonally opposed patterns within the design will preferably have modified phase values such that their values are opposite. Following the calculation of the repeatedly used coefficients, the complex order amplitude of each designated order, CA(m,n), is calculated using the values from PA, wherein $\theta_{j,k}$ is the phase delay associated with phase cell PA(J,K).

A counter, s, which is preset to zero, is incremented, signaling the beginning of two iteration loops, u and v, for examining each phase array cell PA(u,v), block 403. The counter, s, indicates the number of times PA has been examined. The two iteration loops, u and v, may be utilized to examine each of the phase cells sequentially, or, in an alternate preferred embodiment, examining a randomly selected set of N cells, block 404. Preferably, the phase cells are traversed in row-column order, however, any suitable method for traversing PA may be utilized. Selecting a random set of N cells may be preferable in some instances because the time required to sequentially examine all cells may be lengthy, whereas examining smaller randomly selected sets of N cells may provide the status of the optimization process via a merit function more quickly. The preferred merit function will be discussed momentarily, and in more detail with reference to FIG. 5. The examination process for each cell, PA(u,v), preferably includes four comparisons to determine whether the current phase cell under consideration is a phase boundary cell. A phase boundary cell more particularly is an area of transition representative of a surface change within the desired phase grating. The comparisons include a determination of the difference between PA(u,v)'s phase value, $\theta u,v$, and each of the phase values of the cells PA(u+1,v), PA(u,v+1), PA(u−1,v), and PA(u,v−1), respectively, assuming each of the four comparison cells exists within the dimensions of PA, in other words, within the dimension J by K, decisional block 405. If the comparisons indicate that the phase value, $\theta u,v$, of the current phase cell, PA(u,v), and its neighbors are the same, NO branch of decisional block 405, then, if the iteration loops have not been completed, NO branch of decisional block 406, the next cell's, PA(u+1,v) (if a next row exists) or PA(u,v+1) (where u equals 1, if the next column is to be examined) phase value, $\theta$, is considered, block 407. Alternately, if the iteration loops have completed an examination of PA, YES branch of divisional block 406, then a determination is made using the merit function whether the hologram is improving, decisional block 415, which will be discussed momentarily.

Figure 5:
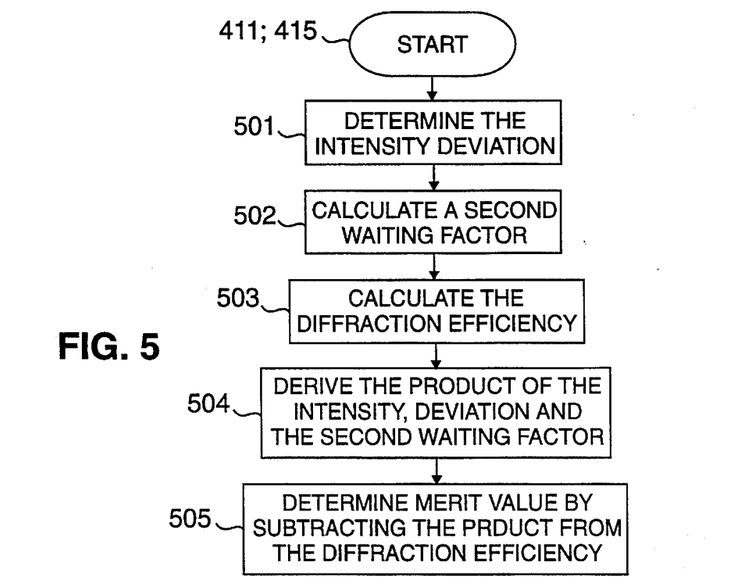
FIG. 5 illustrates a flow diagram of a process for determining a merit value in accordance with the process illustrated in FIGS. 4a and b.

If the phase values of the two cells under consideration are different, YES branch of decisional block 405, then the current phase value, $\theta u,v$, is preferably inserted into a temporary variable and the current neighbor's phase value, $\theta$, is inserted in place of the current phase value, $\theta u,v$, block 408. Note an aspect of the invention is by processing only the phase cells along the boundary of phase transitions, processing time and resource requirements are substantially reduced, and consequently the length of the design process is reduced as well. A temporary image complex amplitude array ("TIA(m,n)") is preferably defined, block 409. TIA(m, n) is initialized as previously described to calculate the complex amplitude of the nth order of the mth row as given by the sum of the contributions from each of the present phase cells, block 410. The quality of this solution is then calculated utilizing a preferred merit function, $$C = \eta - a(s) \cdot \sigma$$

block 411, which is more fully discussed with reference to FIG. 5. If the merit value, C, indicates improvement, YES branch of decisional block 412, then the neighbor's phase value is retained as $\theta u,v$, and the values of the temporary array, TIA(m,n), are transferred to their corresponding coordinate position within the image complex amplitude array, CA(mn), block 413. If the merit value does not indicate improvement, NO branch of decisional block 412, then the temporarily stored current phase value is restored to $\theta u,v$, block 414. In either case, if the iteration loops have not been completed, NO branch of decisional block 406, then the next cell's phase value is considered, block 407.

Alternatively, if the iteration loops have completed the examination of PA, YES branch of decisional block 406, the merit value, C, is again calculated utilizing the merit function, block 415. If the counter, s, is greater than one, indicating that PA has been examined at least twice, then the current merit value is compared with one or more of the prior examinations' merit values to determine if the quality of the current data representation is improving over prior examinations, decisional block 416. If the merit value improves, the process increments the counter, s, and repeats the cell examination and update processes, YES branch of decisional block 416. If the merit value stagnates, however, NO branch of decisional block 416, then the process must determine whether PA should be subdivided, decisional block 417. Merit value stagnation is preferably defined as marginal or no improvement from prior to the current phase cell examination, as for example, when the number of phase cells modified becomes relatively small. The decision to subdivide PA is based upon the merit value reaching a target value within a specified number of iterations. The merit function and value, and the target value, are usually a function of the application, in other words, the desired image generated. For example, in a digital optical system the merit function preferably stresses the low nonuniformity of the beam array intensities, while for an imaging application, as shall be discussed with reference to FIGS. 6–8, the efficiency of coupling light into the target image pixel array, TA, is typically of greater importance. The hologram designer may be required to empirically determine a target threshold based upon previous experience. The number of iterations may also be empirically determined and correlated with the size of the beam array desired, typically from 5 to about 100 iterations for sizes of approximately 4×4 to 256×256, respectively. If the target value is reached, YES branch of decisional block 417, then the phase array is stored to a memory storage device and the process terminates, block 418. The memory storage device may be, for example, RAM 107 or the hard drive 103, both as illustrated in FIG. 1, if temporary or permanent storage, respectively, is required, or a floppy disk, if PA is to be transported, for example. PA, as previously introduced with reference to FIG. 3, is preferably used to create one or more lithographic masks that will transfer the representative phase grating pattern to an optical surface, or substrate, such as glass, for example.

Alternatively, if the target value is not reached, YES branch of decisional block 417, each cell of PA is replicated to form a sub-array of cells, preferably, four times larger than the original cell, block 419. The two coefficient arrays, B and F are recalculated, as is CA(m,n), according to the new phase array format. The examination process is revisited, and the counter, s, is reset to 1, block 404. The object of the subdivision process is to achieve a higher resolution by providing higher frequency components which operate to improve the intensity uniformity of the phase grating. Note that the subdivision process is optionally included, and when included, may not be needed for a particular design. The subdivision process is preferably performed once, or at most twice, during the design process.

FIG. 5 illustrates a flow diagram of the preferred process for performing the merit function discussed with reference to FIGS. 4a and b. As previously introduced, the preferred merit function is given by, $$C = \eta - a(s) \cdot \sigma.$$

In alternate embodiments, the preferred merit function may be modified by or replaced with any suitable function operable to quantify or measure the quality of the data set representative of the desired phase grating. Upon entering the START block, the preferred merit value is calculated. The intensity deviation, $\sigma$, is determined by, $$\sigma = \sum_{t=1}^{T} w_t \cdot (I_t - I_{t_o})^2,$$

wherein $I_t$ is the calculated complex intensity, $I_{t_o}$ is the targeted intensity, and $w_t$ is a first waiting factor, block 501. Note that the summation illustrated may be either a double summation over a full set of m,n, or over a selected subset. $I_t$ is preferably defined as the complex square of CA (m,n). $W_t$ preferably indicates the importance of each generated spot, in other words, the first waiting factor operates to designate which spots must match most closely to their image targets and is empirically determined by the application user. A second waiting factor, a(s), is calculated wherein the counter, s, indicates the number of times PA has been examined, and the second waiting factor is preferably a linearly increasing function starting at about 0.1 and rising to, and retaining, a value of approximately 0.2, preferably after approximately 20 iterations, block 502. The second waiting factor preferably indicates the importance of the intensity deviation, in other words, it operates to require the beam array to be highly uniform and is preferably empirically determined by the application user. The diffraction efficiency, $\eta$, is calculated, $$\eta = \sum_{m=1}^{M} \sum_{n=1}^{N} (CA(m,n))^2,$$

block 503. Preferably, the above calculation is skipped for each value of CA(m,n) equal to zero to improve processing efficiency. The product of the intensity deviation, $\sigma$, and the second waiting factor, a(s), is calculated, block 504. This product is subtracted from the diffraction deficiency, $\eta$, to generate the merit value, C, block 505. Note, when the merit value is calculated upon the completed examination of PA, at block 415 of FIG. 4, the merit value is preferably retained and stored, for example, in a one dimensional array, for comparison with subsequent examinations of the phase array and its associated merit value.

Figure 6:
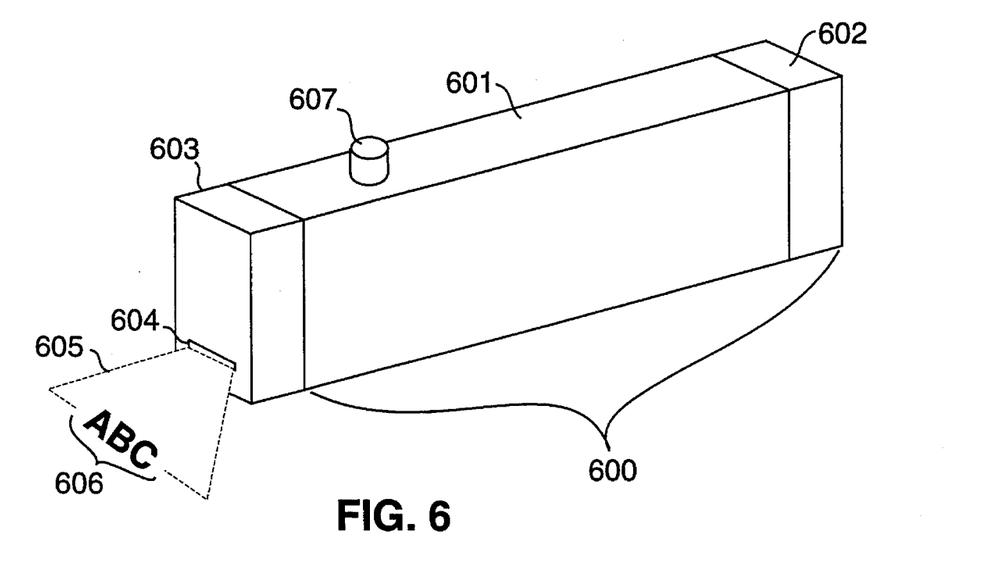
FIG. 6 illustrates an isometric view of a hand held laser pointer which utilizes a phase mask designed in accordance with the principles of the present invention for displaying holographic images.

FIG. 6 illustrates one use of a phase grating designed in accordance with the principles of the present invention, wherein an isometric view of a hand held laser pointer 600 is illustrated. The illustrated laser pointer 600 is more fully disclosed in copending and coassigned U.S. patent application Ser. No. 08/312,859 filed on 9/27/94, entitled "Methods and Apparatus for Generating and Displaying Holographic Images Utilizing a Laser Pointer," which is incorporated herein by reference. The laser pointer 600 includes a longitudinal housing 601, a cap 602, a substrate housing 603 and a button switch 607. The cap 602 and the substrate housing 603 are coupled at opposite ends of the longitudinal housing 601. The substrate housing 603 includes an elongated aperture 604 through which an image beam 605 passes to display the holographic image 607. The image beam 605 is produced by illuminating a phase grating, designed in accordance with the principles of the present invention, with a laser beam. The illumination occurs internal to the longitudinal housing 601, and is discussed with reference to FIG. 7. The button switch 607 may be selectively depressed for a time period during which the laser pointer 600 generates the laser beam.

Figure 7:
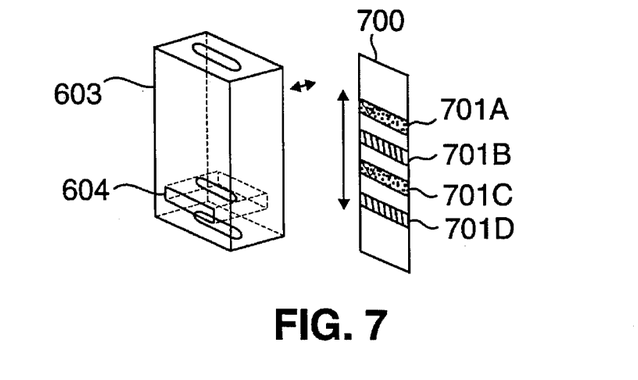
FIG. 7 illustrates an isometric view of the substrate housing, illustrated in FIG. 6, and a single substrate.

FIG. 7 illustrates an isometric view of the substrate housing 603 and a single substrate 700. The illustrated substrate 700 includes four phase gratings 701a to 701d preferably designed in accordance with the process discussed in detail with reference to FIGS. 3–5. Each of the gratings 701 is representative of a distinct wave disturbance associated with a select object, such as an arrow, a hand, a slogan, or a face, as examples. When at least one of the phase gratings 701 is illuminated by the laser beam its representative image is generated. An aspect of the present invention is that significantly detailed and specialized phase gratings 701 may be generated relatively quickly in accordance with the present invention, making such alternate applications as illustrated in FIGS. 6 and 7 both commercially desirable and feasible.

Figure 8A:
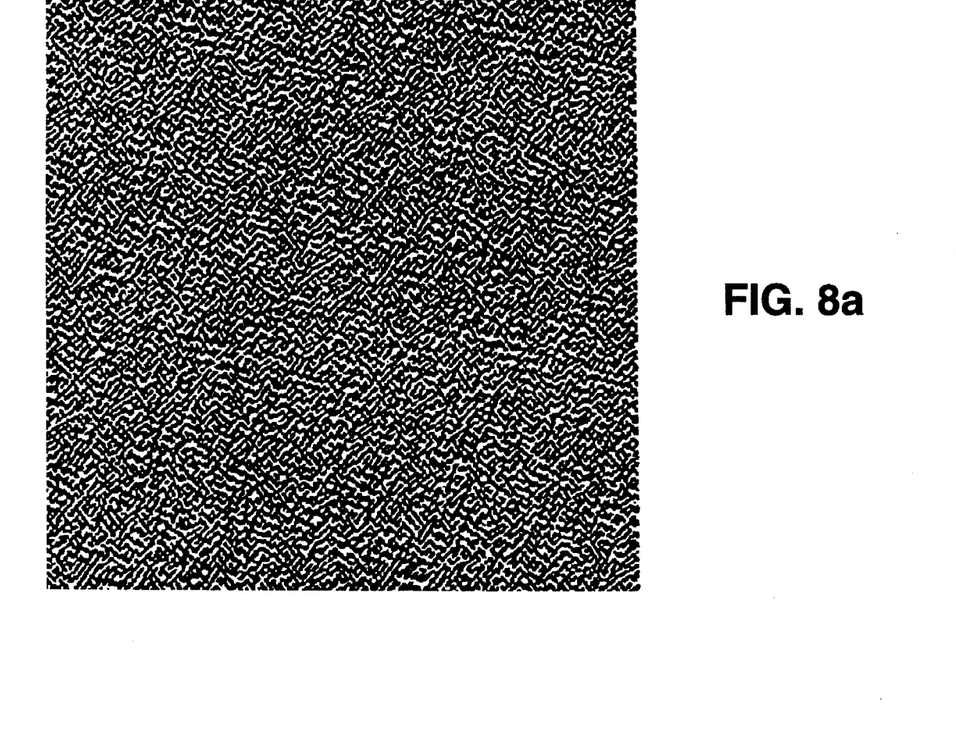
FIG. 8a illustrates an artist's rendition of a phase grating designed in accordance with the principles of the present invention for use with the laser pointer in FIG. 6.
Figure 8B:
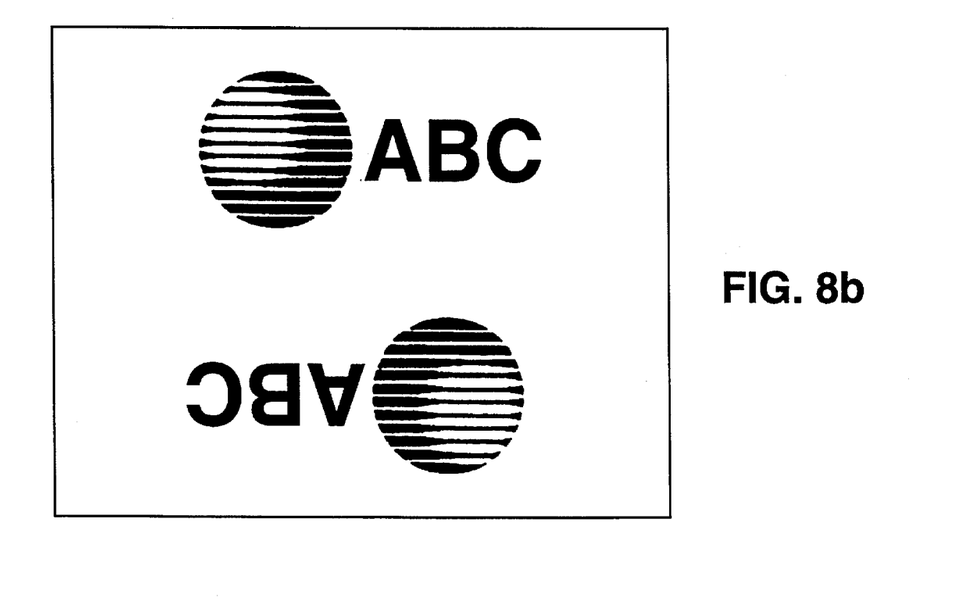

FIG. 8a illustrates an artist's rendition of a phase grating designed in accordance with the principles of the present invention for use with the laser pointer in FIG. 8. This phase grating includes both light and dark areas representative of the surface heights fixed to the underlying substrate 700. For example, assuming that the phase grating has been etched into the substrate, the light areas might represent the unetched portions, whereas the dark areas would represent the etched portions. FIG. 8b illustrates an artist's rendition of a holographic image generated utilizing the hand held laser pointer in FIG. 6 to illuminate the phase grating in FIG. 8a.

Figure 9A:
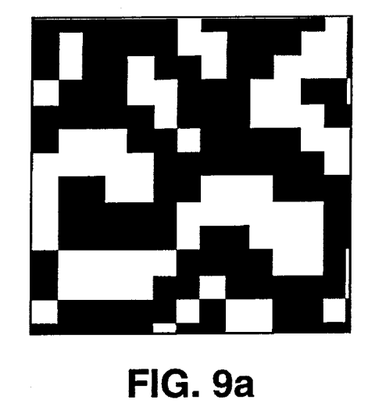
FIGS. 9a, 9c and 9e illustrate an artist's rendition of phase gratings designed in accordance with the principles of the present invention for use in photonic switching systems.
Figure 9B:
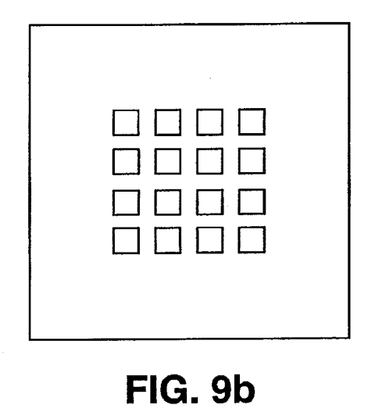
FIGS. 9b, 9d and 9f illustrate an artist's rendition of the holographic images associated with the phase gratings illustrated in FIGS. 9a, 9c and 9e, respectively.
Figure 9C:
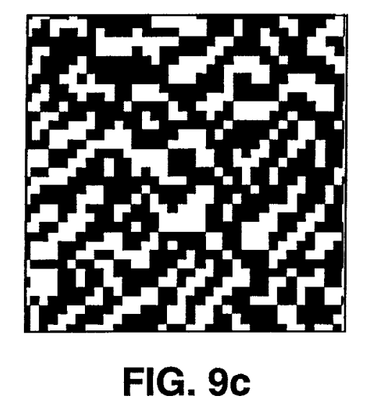
Figure 9D:
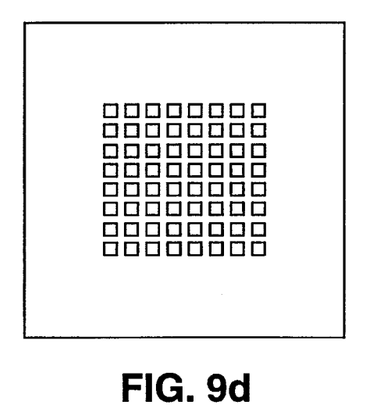
Figure 9E:
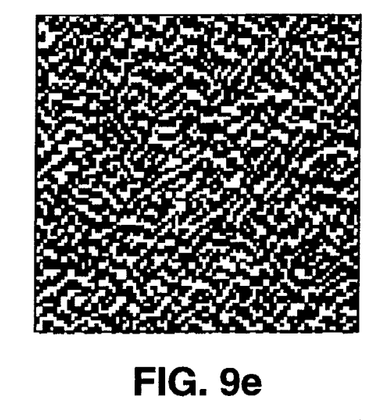
Figure 9F:
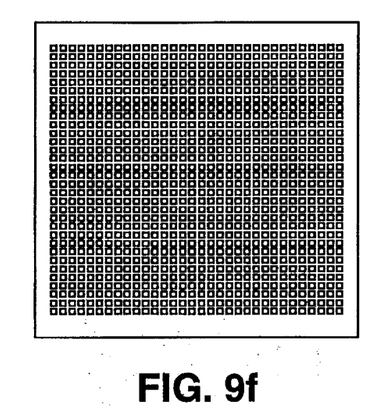

FIGS. 9a, 9c and 9e illustrate an artist's rendition of three phase gratings designed in accordance with the principles of the present invention for use in photonic switching systems. FIGS. 9b, 9d and 9f illustrate an artist's rendition of the holographic images generated when the phase gratings illustrated in FIGS. 9a, 9c and 9e, respectively, are intersected and illuminated by a coherent laser source. Note that the detail increases with each holographic image, FIGS. 9b, 9d and 9f, in relation to the associated spot array of the phase grating, FIGS. 9a, 9c and 9e, respectively. Note that the illustrated spots of FIGS. 9b, 9d and 9f are square, implicitly indicating that the illuminating beam is square.

Although the present invention and its advantages have been described in detail, it should be understood that various changes, substitutions and alterations can be made herein without departing from the spirit and scope of the invention.

I claim:

1. A system comprising:
   input means for receiving an input data set representing a desired image intensity;
   means for generating an output data set representing a desired phase grating, said output data set comprising a plurality of phase cells, each one of said phase cells including a phase value;
   means for traversing ones of said plurality of phase cells, each one of said traversed phase cells' phase value is in one of a first state equal to an adjacent phase cell's phase value and a second state not equal to said adjacent phase cell's phase value; and
   means, operable when a current traversed phase cell's phase value is in said second state, for processing said output data set as a function of said input data set to improve the quality of said desired phase grating.

2. The system as set forth in claim 1 further comprising output means for transmitting said output data set.

3. The system as set forth in claim 1 wherein said generating means includes initialization means for initializing said output data set.

4. The system as set forth in claim 3 wherein said initialization means utilizes scaler diffraction to assign at least one initial value to each of one of said phase cells.

5. The system as set forth in claim 1 wherein said processing means includes means for temporarily storing said current traversed phase cell's phase value.

6. The system as set forth in claim 5 wherein said processing means further includes means for setting said current traversed phase cells' phase value equal to said adjacent phase cell's phase value.

7. The system as set forth in claim 6 wherein said processing means includes means for utilizing a merit function to derive a merit value representative of one of an improvement of the quality of said desired phase grating, a regression of the quality of said desired phase grating, and a stagnation of the quality of said desired phase grating.

8. The system as set forth in claim 7 wherein said processing means further includes means, enabled when said stagnation of the quality of said desired phase grating is derived, for subdividing said output data set.

9. A processing system for processing a received input data set to produce an output data set, said received input data set representative of a desired image and said output data set representative of a phase grating operable to generate said desired image when illuminated by a coherent radiation source, said processing system comprising:
   input means for receiving said input data set; and
   at least one processing unit operable to:
      generate and initialize said output data set comprising a plurality of subsets; and
      selectively examine said output data set by probing ones of said subsets to locate a phase boundary, and upon location of said phase boundary, process said output data set as a function of said input data set to improve the quality of said desired phase grating.

10. The processing system as set forth in claim 9 further comprising memory storage means for storing a plurality of processing system instructions.

11. The processing system as set forth in claim 10 wherein said processing unit operates to retrieve and execute at least one of said processing system instructions from said memory storage means, said retrieved and executed instruction directing said processing unit to produce said output data set.

12. The processing system as set forth in claim 9 further comprising output means for transmitting said output data set.

13. The processing system as set forth in claim 9 wherein said processing unit is further operable to utilize scaler diffraction to initialize each of one of said subsets.

14. The processing system as set forth in claim 9 wherein said processing unit is further operable, upon location of said phase boundary, to store a current examined subset to a data area within a memory storage device.

15. The processing system as set forth in claim 9 wherein said processing unit is further operable, upon storing said current examined subset, to set said current examined subset equal to another subset thereby modifying the quality of said desired phase grating represented by said output data set.

16. The processing system as set forth in claim 15 wherein said processing unit is further operable to calculate a merit value representative of one of an improvement of the quality of said desired phase grating, a regression of the quality of said desired phase grating, and a stagnation of the quality of said desired phase grating.

17. The processing system as set forth in claim 16 wherein said processing unit, upon stagnation of the quality of said desired phase grating, is further operable to store said output data set to a memory storage device.

18. The processing system as set forth in claim 16 wherein said processing unit, upon stagnation of the quality of said desired phase grating, is further operable to subdivide said output data set.

19. The processing system as set forth in claim 16 wherein said processing unit, upon regression of the quality of said desired phase grating, is further operable to reset said current examined subset equal to said data area.

20. A method for generating an output data set representative of a phase grating, said method comprising the steps of:

receiving an input data set representative of a desired image intensity;

defining and initializing said output data set, said output data set comprising a plurality of subsets;

traversing said output data set to selectively examine ones of said plurality of subsets to determine if a current examined subset represents a phase boundary;

processing, upon a determination that said current examined subset represents said phase boundary, said output data set as a function of said input data set to improve the quality of said phase grating.

21. The method as set forth in claim 20 further comprising the step of transmitting said output data set.

22. The method as set forth in claim 20 wherein said defining and initializing step further comprises the step of utilizing scaler diffraction to assign at least one initial value to each of one of said subsets.

23. The method as set forth in claim 20 wherein said processing step further includes the step of temporarily storing the value of said current examined subset.

24. The method as set forth in claim 23 wherein said processing step further includes the step of setting the value of said current examined subset equal to the value of an adjacent subset.

25. The method as set forth in claim 24 wherein said processing step further includes the step of calculating a merit value representative of one of an improvement of the quality of said phase grating, a regression of the quality of said phase grating, and a stagnation of the quality of said phase grating.

26. The method as set forth in claim 25 wherein said processing step further includes the step of subdividing said output data set when said merit value indicates stagnation of the said phase grating.

27. The method as set forth in claim 25 wherein said processing step further includes the step of storing said output data set when said merit value indicates stagnation of the said phase grating.

28. The method as set forth in claim 25 wherein said processing step further includes the step of resetting the value of said current examined subset equal to the temporarily stored value when said merit value indicates regression.

29. The method as set forth in claim 20 wherein said processing step further includes the step of returning to said traversing step.

30. A method for generating a phase data set representative of a desired phase grating, said method comprising:

receiving an image data set comprised of a plurality of pixels, said image data set representative of a desired beam array image;

defining and initializing said phase data set as a function of said image data set, said phase data set comprised of a plurality of phase cells, wherein said plurality of phase cells collectively correspond via scaler diffraction to said plurality of pixels;

examining ones of said plurality of phase cells; and selectively processing, upon a determination that a current examined phase cell is different from an adjacent phase cell, said phase data set as a function of said image data set to improve the quality of said desired beam array image, said selectively processing step including the steps of:

copying said current examined phase cell to a variable;

setting said current examined phase cell equal to said adjacent phase cell; and calculating a merit value representative of the quality of said desired phase grating for coupling radiation into a set of designated orders, said merit value indicating one of an improvement of said desired beam array image, a regression of said desired beam array image, and a stagnation of said desired beam array image, said calculating step further including the steps of:

returning to said examining step when said merit value indicates improvement;

resetting said current examined phase cell from said variable when said merit value indicates regression, and returning to said examining step; and storing said phase data set when said merit value indicates stagnation.

31. The method as set forth in claim 30 wherein said storing step further includes the step of returning to said examining step when a target threshold has not been attained, said target threshold is empirically based upon prior experience.

* * * * *